United States Patent [19]

Hashimoto et al.

[11] Patent Number: 5,119,204
[45] Date of Patent: Jun. 2, 1992

[54] LIQUID CRYSTAL TELEVISION SET HAVING DRIVING CIRCUIT ON PERIPHERAL PORTION AND METHOD OF FABRICATION OF IMAGE DISPLAY SECTION

[75] Inventors: Yoichiro Hashimoto; Hideo Misono, both of Yokohama, Japan

[73] Assignee: Hitachi, Ltd., Tokyo, Japan

[21] Appl. No.: 436,722

[22] Filed: Nov. 15, 1989

[30] Foreign Application Priority Data

Nov. 18, 1988 [JP] Japan ................ 63-289980

[51] Int. Cl.⁵ .............................. H04N 5/64
[52] U.S. Cl. .................... 358/254; 358/241
[58] Field of Search ............... 340/718, 719; 358/254, 358/236, 241; 350/345

[56] References Cited

U.S. PATENT DOCUMENTS

| | | | |
|---|---|---|---|
| 4,562,478 | 12/1985 | Hirasawa et al. | 358/236 |
| 4,614,406 | 9/1986 | Motoi | 340/718 X |
| 4,639,225 | 1/1987 | Washizuka | 358/254 X |
| 4,652,932 | 3/1987 | Miyajima et al. | 358/236 |
| 4,694,347 | 9/1987 | Ito | 358/236 |
| 4,789,858 | 12/1988 | Fergason et al. | 340/718 X |
| 4,809,078 | 2/1989 | Yabe et al. | 350/345 X |
| 4,837,817 | 6/1989 | Maemori | 358/224 |

FOREIGN PATENT DOCUMENTS

| | | | |
|---|---|---|---|
| 60-3282 | 1/1985 | Japan | 358/254 |
| 62-10976 | 1/1987 | Japan . | |
| 62-10977 | 1/1987 | Japan . | |
| 62-10978 | 1/1987 | Japan . | |

*Primary Examiner*—James J. Groody
*Assistant Examiner*—Mark R. Powell
*Attorney, Agent, or Firm*—Antonelli, Terry, Stout & Kraus

[57] ABSTRACT

In a liquid crystal TV set, a liquid crystal panel includes an image display section constituted by a liquid crystal for displaying an image and a peripheral portion of the image display section having horizontal and vertical scanning circuits for driving the liquid cyrstal. A operating unit having a plurality of switches is arranged on the front of the peripheral portion. The switches of the operating unit includes at least a thin key switch are are arranged in matrix. This construction permits the liquid crystal panel to be arranged in the same plane as the operating unit, reducing both the size of a liquid crystal TV set and the number of assembly steps thereof at the same time.

20 Claims, 6 Drawing Sheets

F I G. 4
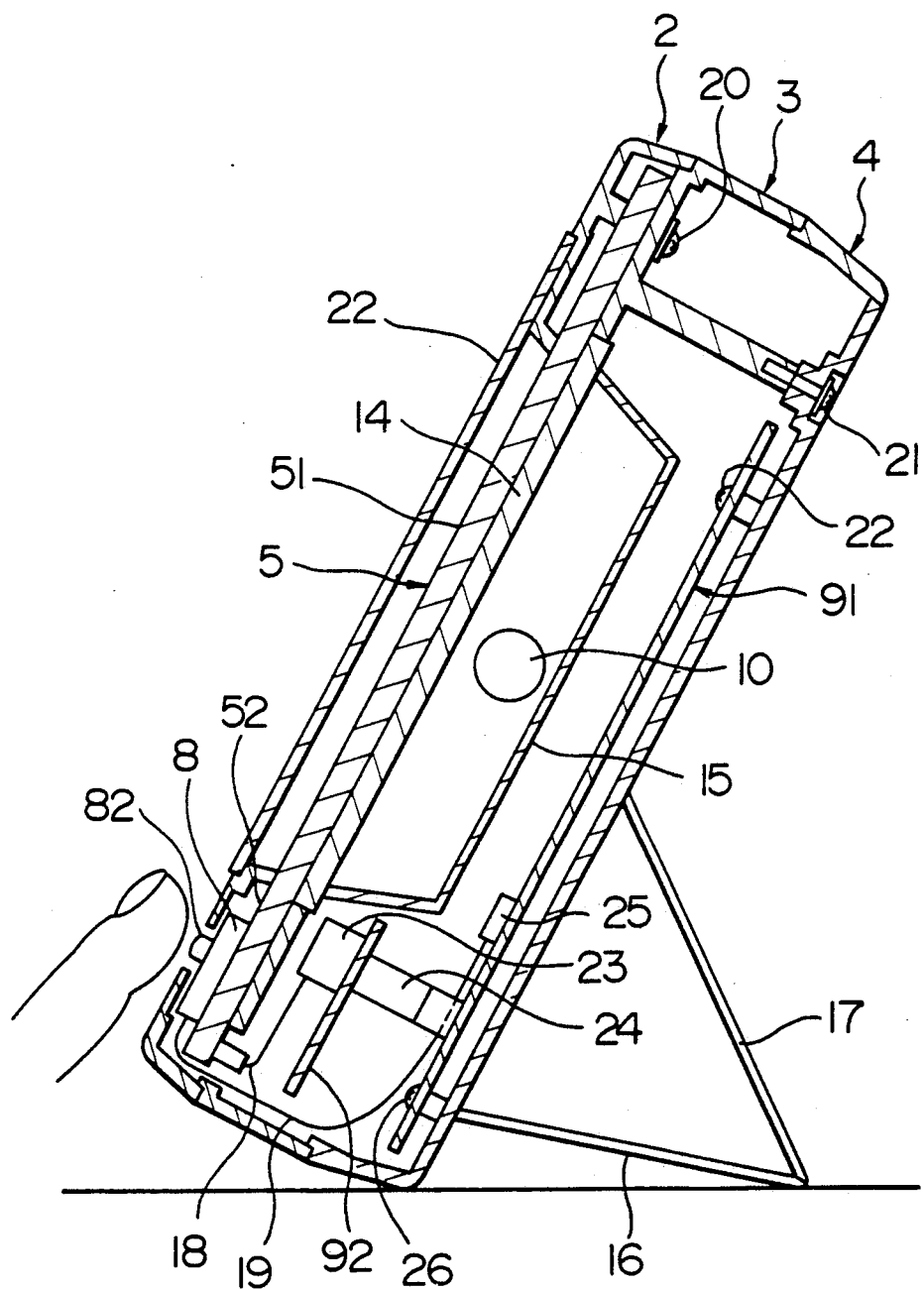

LIQUID CRYSTAL TELEVISION SET HAVING DRIVING CIRCUIT ON PERIPHERAL PORTION AND METHOD OF FABRICATION OF IMAGE DISPLAY SECTION

BACKGROUND OF THE INVENTION

The present invention relates to a liquid crystal television set, and more in particular, to a liquid crystal television set and a method of fabrication thereof having a feature in the arrangement of an operating unit thereof.

Conventional liquid crystal television sets have an operating unit arranged on other than the liquid crystal panel as viewed from the front, as disclosed, for example, in JP-A(U)-61-94883. The front outline of such liquid crystal television sets thus requires a total area more than the sum of the areas of the liquid crystal panel and the operating unit.

The aforementioned fact that an area more than the sum of the areas of the liquid panel and the operating unit is required for the front outline of a liquid crystal television set does not pose any problem so far as the television set is as small as two or three inches the in diagonal line of the liquid crystal panel. For liquid crystal panel sizes of four inches or more, however, such a fact poses a bottleneck against reducing the outline of a liquid crystal television set.

SUMMARY OF THE INVENTION

A first object of the present invention is to provide a compact liquid crystal TV set small in outer size even if the liquid crystal panel thereof is large in size.

A second object of the present invention is to provide a method of fabricating a liquid crystal TV set convenient to assemble.

The first object is achieved by arranging an operating unit on the front of the peripheral portion other than the image display section of a liquid crystal panel.

The second object is achieved by holding an operating unit between a top case and a liquid crystal panel, mounting a center case thereon, securing the top case and the center case to each other, and securing a bottom case fixedly carrying a circuit board inside.

According to one aspect of the present invention, there is provided a liquid crystal TV set, in which the arrangement of an operating unit within the size of the liquid crystal panel reduces the outer size of the TV set to a minimum necessary for housing the liquid crystal panel, and the construction of a thin operating unit permits it to be located in a clearance between a shield case of the liquid crystal panel and a TV case, thus assuring a small depth of the TV set.

According to another aspect of the present invention, there is provided a method of fabricating a liquid crystal TV set, in which a plurality of cases, a liquid crystal panel, an operating unit, and other parts are assembled sequentially for an improved assembly efficiency.

BRIEF DESCRIPTION OF THE DRAWINGS

FIG. 4 is a side sectional view showing the operating conditions of the liquid crystal TV set shown in FIG. 1.

DESCRIPTION OF THE PREFERRED EMBODIMENTS

An embodiment of the present invention will be explained below with reference to FIGS. 1 to 6.

Figure 1:
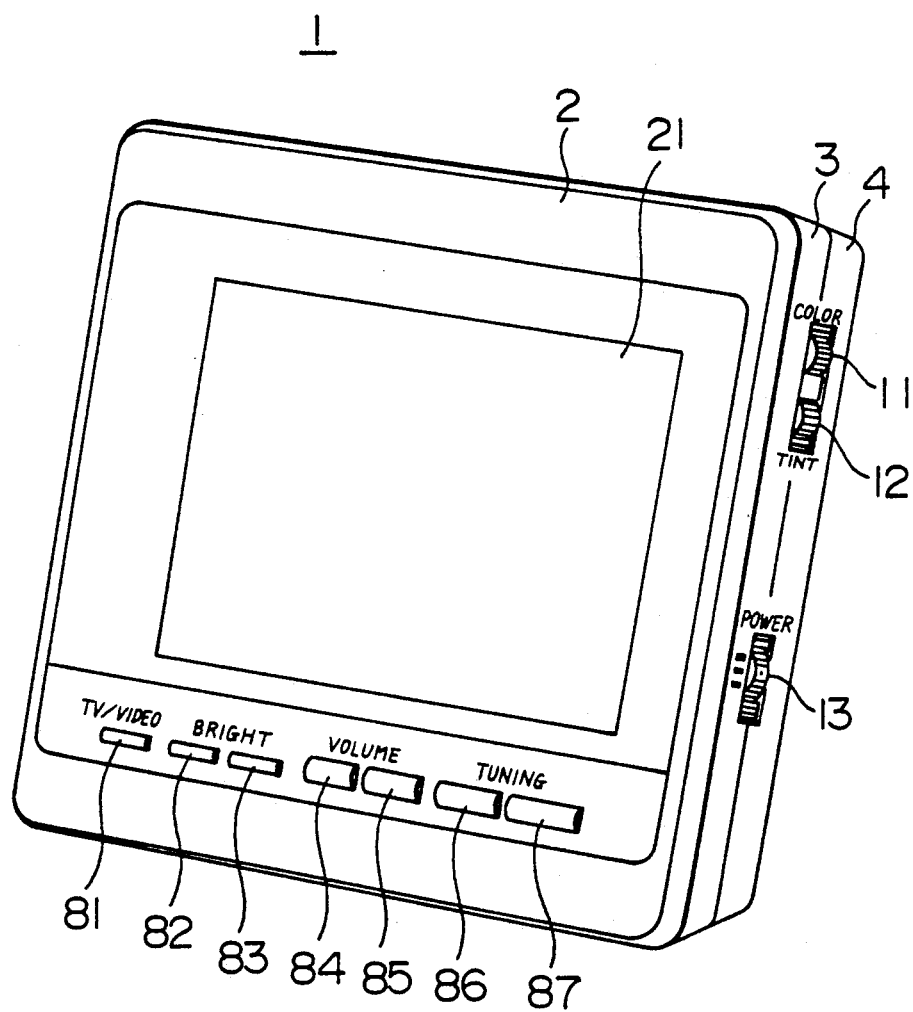
FIG. 1 is an outside view of a liquid crystal TV set according to an embodiment of the present invention.

An outer perspective view of a liquid crystal TV set according to the present invention is shown in FIG. 1. The housing of a liquid crystal TV set 1 is formed of three cases including a top case 2, a center case 3 and a bottom case 4. The top case 2 has a front plate 21 of a transparent material attached thereto. As shown by dashed lines in FIG. 3, a screen or image display section 51 of the liquid crystal panel 5 is seen through the front plate 21.

The top case 2 has operating switches 81, 82, 83, 84, 85, 86, 87 in key form at the lower part. These operating switches 81, 82, 83, 84, 85, 86, 87 are arranged above the lower peripheral portion of the liquid crystal panel described later. Each of the operating switches 81, 82, 83, 84, 85, 86, 87 is operated so frequently as to affect the operability of the TV set. The operating switch 81 is for switching television and VTR (video tape recorder) monitor. A touch of the operating switch 81 starts the function of television and another touch that of a VTR monitor. These operations will be explained in detail later with reference to the block diagram of FIG. 6. The operating switches 82, 83 are for adjusting the brightness. When the left operating switch 82 is pressed, the brightness is decreased, and the brightness continues to be decreased if this switch is kept depressed. At the press of the operating switch 83, on the other hand, the brightness progressively increases. The operating switches 84, 85 are for regulating the sound volume. If the left switch 84 is pressed, the sound volume decreases, and upon continued depression, the sound volume continues to decrease. The operating switch 85 is for increasing the sound volume upon depression thereof. The operating switches 86, 87 are for tuning. Press the left operating switch 86, and the channel number selected by the tuner is decreased in number, and the continued depression thereof progressively decreases the channel number. The operating switch 87 is for progressively increasing the channel number upon depression thereof.

The liquid crystal TV set has on the right side of the body thereof control units lower in operating frequency than the operating switches 81, 82, 83, 84, 85, 86, 87. These control units are mechanical switches either of knob or change-over type. A knob 11 is for regulating the color darkness, and by rotating this knob upward or downward, the color darkness is regulated. A knob 12, which is for regulating the hue, is adapted for turning upward or downward to adjust the hue. A knob 13 provides a power switch operable in three stages. By sliding this switch upward or downward, the on-off of power and the charging conditions are switchable.

Although not shown in the drawing, a slide switch for switching VHF and UHF bands is disposed on the top of the body of the liquid crystal TV set. Input-output terminals of the TV set include an external antenna terminal on the top of the liquid crystal TV set body, and a video input terminal, an earphone terminal and an external power terminal on the left side of the TV set body. A contractable antenna of rod type is also mounted on the top of the liquid crystal TV set although not shown in the drawing.

Figure 2:
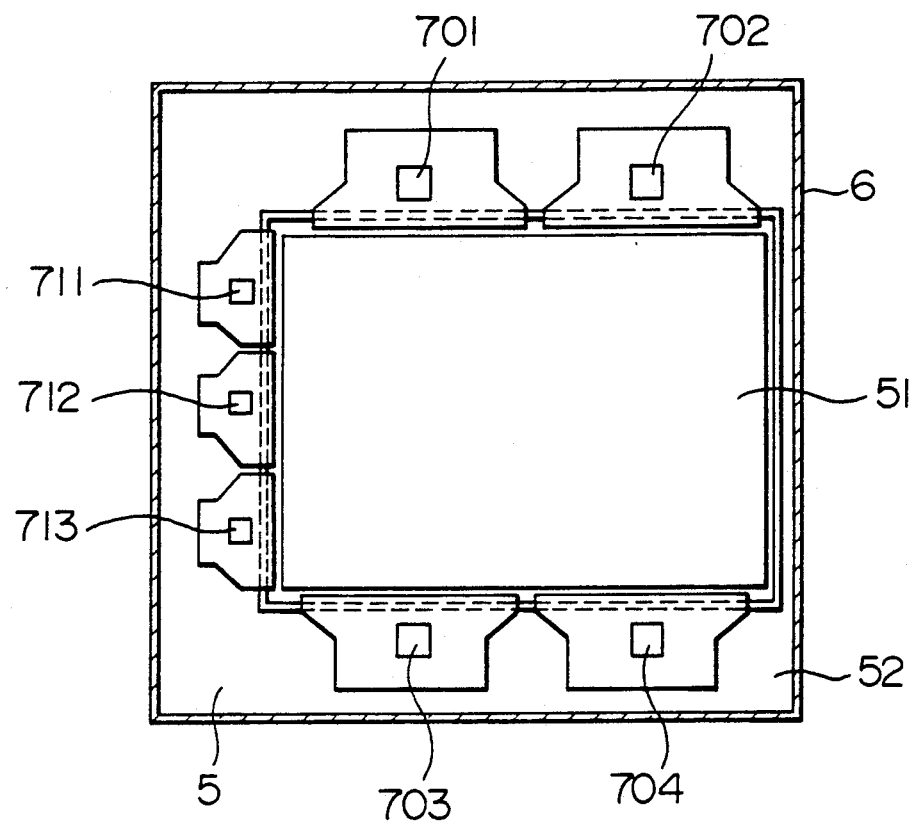
FIG. 2 is a sectional view of a liquid crystal panel configuration of the liquid crystal TV set shown in FIG. 1.

A front partial sectional view of the liquid crystal panel 5 is shown in FIG. 2. The liquid crystal panel 5 normally includes an image display section 51 made of transparent glass electrodes holding liquid crystal therebetween for displaying an image, and a peripheral section 52 having arranged thereon horizontal scanning units 701, 702, 703, 704 and vertical scanning units 711, 712, 713 for driving the image display section 51. The peripheral section 52 is covered with a metal shield plate 6 for preventing leakage of the scanning signal to an external unit. As a result, in appearance, the liquid crystal panel 5 has a part of the shield plate 6 cut away and the image display section 51 of the liquid crystal panel exposed from the central part.

The horizontal scanning units 701, 702 are for controlling the pixels of odd-numbered lines and the horizontal scanning units 703, 704 for controlling those of even-numbered lines. The horizontal scanning units for the odd- and even-numbered lines are divided into two parts respectively. A liquid crystal panel five inches in diagonal line has 480 horizontal scanning lines.

The vertical scanning units 711, 712, 713 include three portions, and there are 240 vertical scanning lines for a liquid crystal panel five inches in diagonal line.

The horizontal scanning units, instead of being divided into two parts, may be provided only under the image display section 51 of the liquid crystal panel without being divided. In such a case, the peripheral portion 52 is positioned in the form of L but not in the form of channel as shown in FIG. 2. Also, the vertical scanning units may be divided into two parts on the right and left sides.

Figure 3:
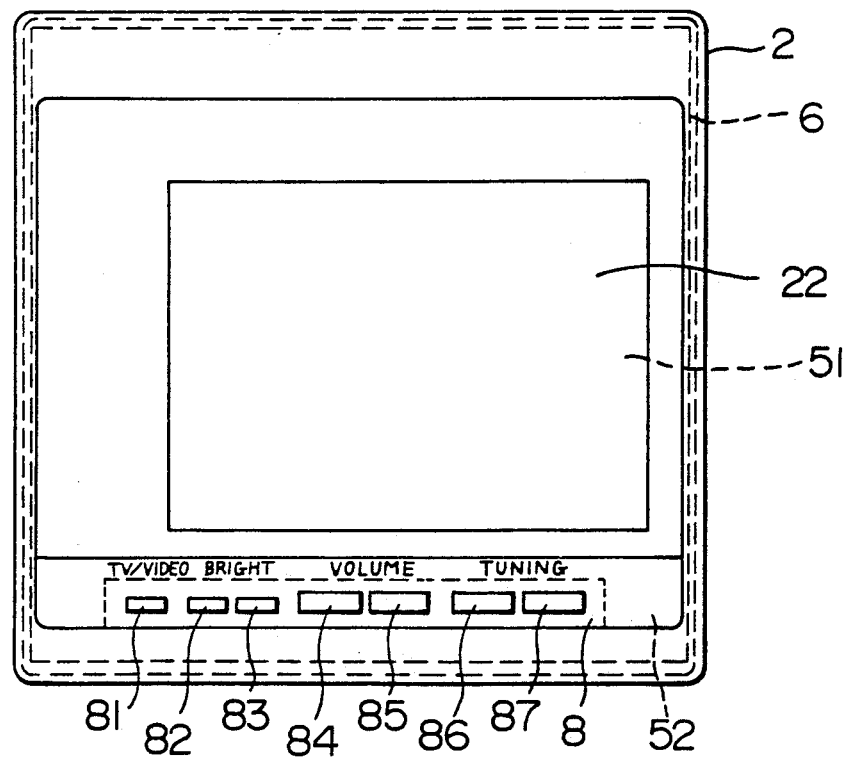
FIG. 3 is an outer front view showing the manner in which a liquid crystal panel is housed in the liquid crystal TV set of FIG. 1.

A front view of a liquid crystal TV set body is shown in FIG. 3. The liquid crystal panel 5 arranged inside of a top case 2 is shown by dashed line. Specifically, the image display section 51 is visible through a transparent front plate 21 and has an image displayed thereon. An operating unit 8 including operating switches 81, 82, 83, 84, 85, 86, 87 of key type are arranged on the peripheral portion 52 of the liquid crystal panel 5.

FIG. 4 shows a side sectional view of the liquid crystal TV set body. The liquid crystal panel 5 is mounted between the top case 2 and the center case 3. The operating unit 8 including the operating switches 81, 82, etc. is arranged between the top case 2 and the shield case 6 covering the peripheral portion 52 of the liquid crystal panel 5 along the peripheral portion 52 under the liquid crystal panel 5. Protrusions 81 of the operating switches 81, 82, etc. are projected from the top case 2 so that the protrusions 81 are adapted for pressing operation from the front side.

Also, circuit boards 91, 92 and a back light 10 are mounted between the center case 3 and the bottom case 4.

The back light 10 has a diffusion plate 14 at the front part thereof in contact with the image display section 51 of the liquid crystal panel 5 thereby to render uniform the light from the back light 10 and from the reflector 15 behind the same. The back light 10 uses a single straight tube which may be replaced by a U-shaped tube or a couple of straight tubes as required with equal effect.

The circuit boards include a main board 91 and a subordinate board 92, which are connected to each other by a post 24 having a lead wire built therein. The subordinate board 92 carries thereon a control section for controlling the liquid crystal panel 5 as described later. The vertical and horizontal scanning circuits of the liquid crystal panel 5 are connected to a connector 18, which in turn is connected to a connector 23 on the subordinate board 92 by a flexible board 18. The operating unit 8 including the operating switches 81, 82, etc are also connected to a connector 25 on the main board 91 by a flexible board 19.

The top case 2 and the center case 8 are secured by a screw 20, with the result that the liquid crystal panel 5 is fixedly positioned between the top case 2 and the center case 3. The main board 91 is fixedly disposed on the bottom case 4 by screws 22, 26. The bottom case 4 is secured fixedly on the center case 3 by a screw 21. The back light 10, the diffusion plate 14 and the reflector 15 fixed integrally to each other are secured fixedly on the center case 3.

The bottom case 4 has mounted thereon stands 16, 17 foldable in two parts. These stands 16, 17 are bent as shown in their use with the angles thereof adjustable in three stages. The stages of angle for adjustment may alternatively be more than three. The stands 16, 17 are adapted to be extended and held in straight form in close contact with the bottom case 4 when not in use.

The operating unit 8 is arranged under the front part of the liquid crystal TV set. When the protrusion 82 of the operating unit 8 is pressed by finger as shown in FIG. 4, therefore, the stands 16, 17 are positioned along the direction in which the force is applied by the finger, thus assuring the stability and the operating ease of the liquid crystal TV set.

The position of the operating unit 8 may alternatively be on the left side or above the image display section 51 in FIG. 2, provided, however, that it must be located on the peripheral portion 52.

In the case of a stand of a type not held on the desk but hung on the wall or the like, the operating unit 8 arranged above or on the left side of the image display section 51 might be more easily operable depending on relative positions of the operator and the liquid crystal TV set. The arrangement may alternatively be determined from the standpoint of design appeal.

Figure 5:
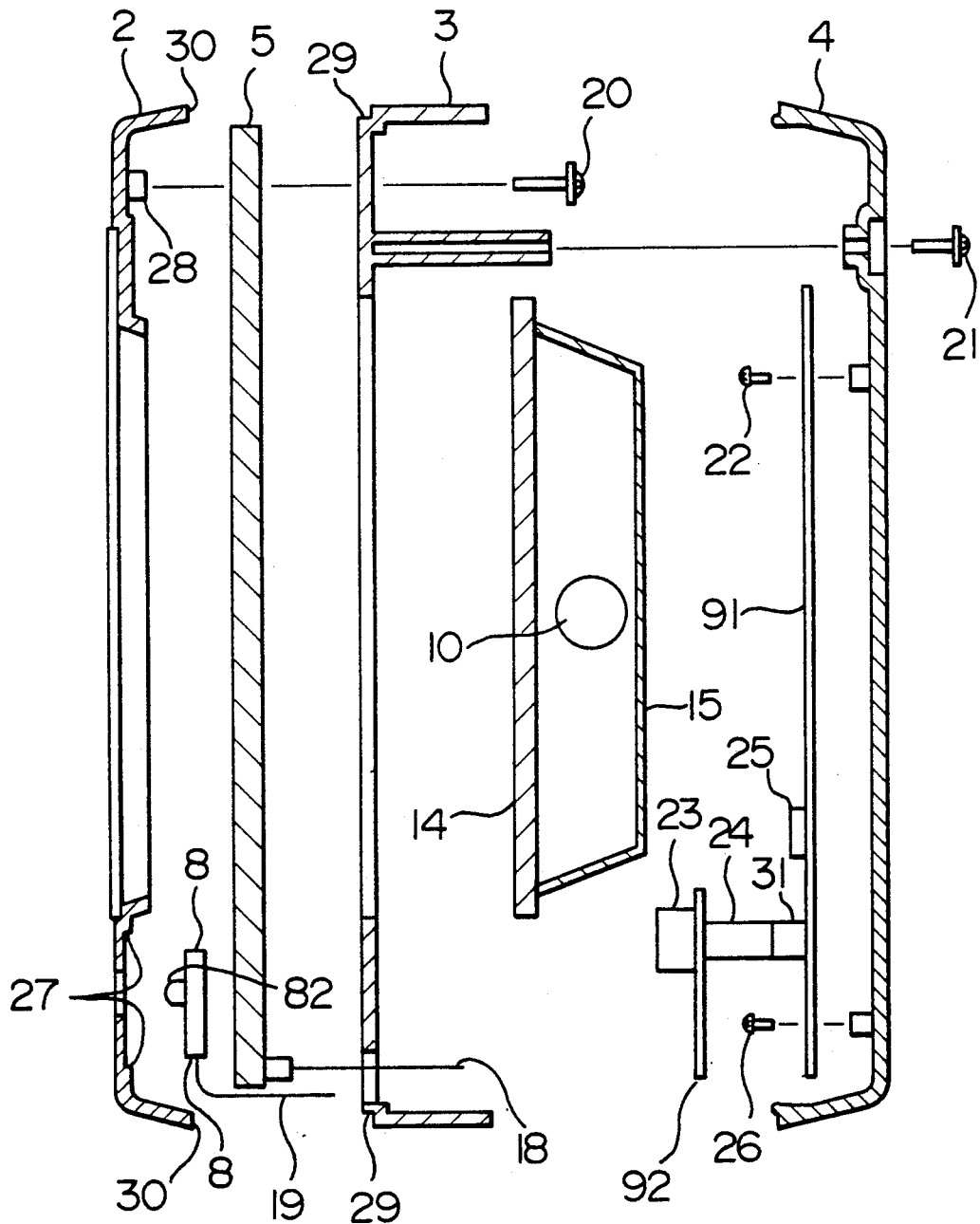
FIG. 5 is an exploded side sectional view of the liquid crystal TV set shown in FIG. 1.

FIG. 5 is an exploded sectional view showing steps of fabricating the liquid crystal TV set. First, the operating unit 8 is fitted in position at stepped portions 27 below the top case 2 to project a protrusion 82 of the operating unit 8 from the hole of the top case 2.

Then, the recess (not shown) of the liquid crystal panel 5 is fitted in the upper protrusion 28 of the top case 2 to set the liquid crystal panel 5 in position. The center case 3 is mounted on this assembly. Relative positions of the assembly and the center case 3 are secured by stepped portions 29 on the outer periphery of the center case 3 and an output periphery 30 of the top case 2. After that, the top case 2 and the center case 3 are secured by screws 20. Out of the screws 20 including two upper screws and two lower screws, the lower ones are not shown in the drawing and one of the upper screws is hidden behind shown screw 20. The back light 10, the diffusion plate 14 and the reflector 15, after being fixed integrally, are secured on the center case 3 by being pressed on the center case 3. The bottom case 4, on the other hand, is assembled in the manner mentioned below. Specifically, the main board 91 is fixed on the bottom case 4 by screws 22, 26. The main board 91 has fixed thereon a connector 31. A lead wire built in the connector 31 and exposed from the ends of the latter is inserted in a post 24 to secure the connector 31. The lead wire exposed from the other end of the connector 31 is inserted into the hole of the subordinate board 92 and soldered therein. The IC and the like on the subordinate board 92 are connected with the lead wire by a printed wiring formed on the subordinate board 92. After this assembly work, the flexible wiring 18, 19 are connected to the connectors 23, 25. The assembly unit of the top case 2 and the center case 3 is fixedly secured to the bottom case 4 by a screw 21.

As described above, the top case, the operating unit, the liquid crystal panel and the center case are mounted to fix the top case with the center case as a first step; a back light unit including the back light, the diffusion plate and the reflector is secured on the center case as a second step; a circuit board is secured in the bottom case as a third step; and the bottom case is fixed on the center case as a fourth step. The assembly process for fabrication involving only these four steps improves the assembly efficiency.

The conventional methods of fabricating a liquid crystal TV set, in contrast, requires six steps of securing a liquid crystal panel on a top case (first step), fixing an operating unit on the top case (second step), fixing a back light unit on a center case (third step), securing a top case on the center case (fourth step), fixing a circuit board on a bottom case (fifth step), and finally fixing the bottom case on the center case (sixth step).

The back light unit may alternatively be mounted on the bottom case 4.

Figure 6:
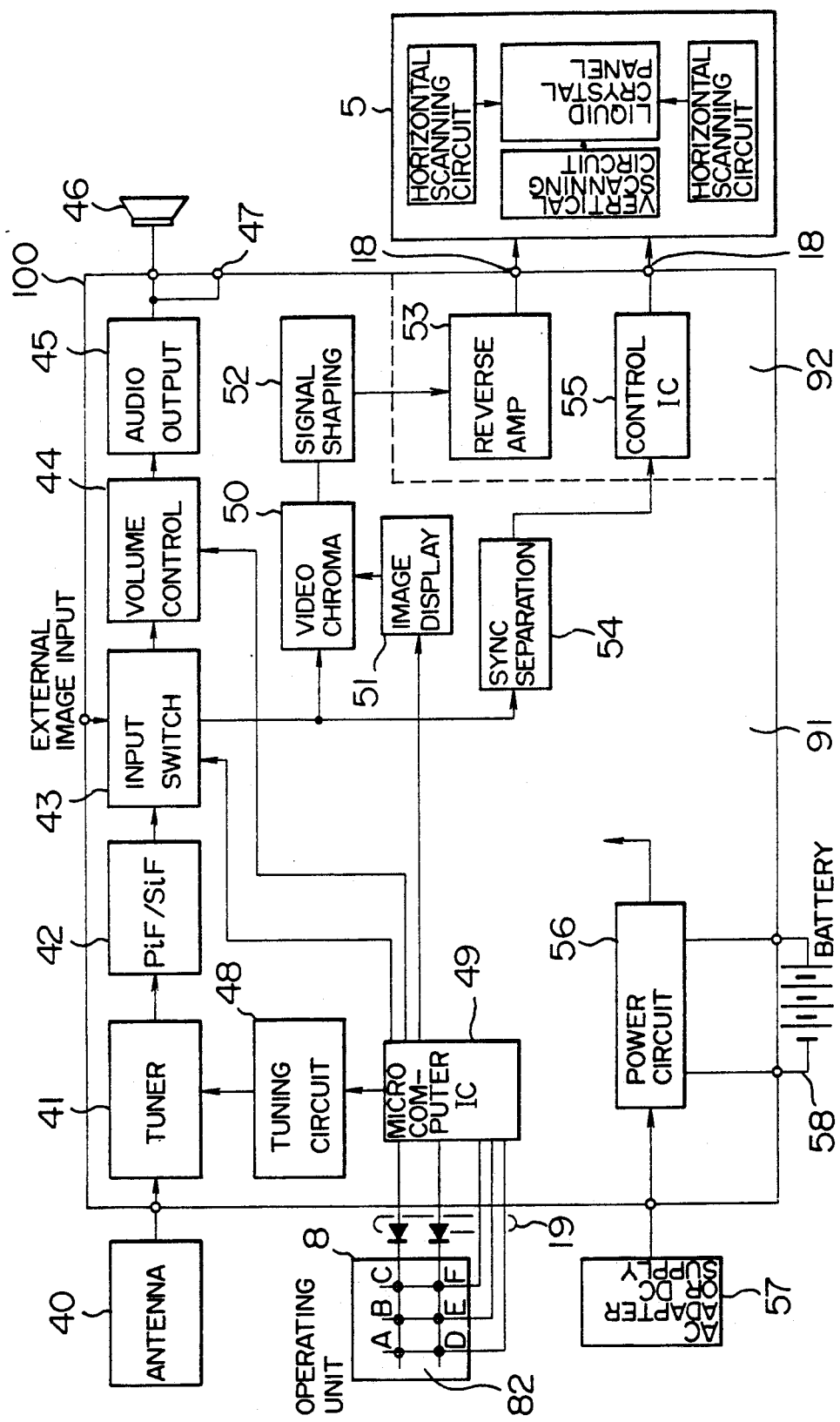
FIG. 6 is a block diagram showing a circuit configuration of the liquid crystal TV set of FIG. 1.

A block diagram of a liquid crystal TV set according to an embodiment of the present invention is shown in FIG. 6. The liquid crystal TV set 100 receives a broadcasting wave at a tuner 41 through an antenna 40, and produces a video-audio signal of a channel (frequency) selected by a tuning circuit 48. This signal is separated into a video signal and an audio signal at an video-audio intermediate frequency amplifier circuit 42. A signal from the video-audio intermediate frequency amplifier circuit 42 and a signal from an external video unit are produced by being selected at an input change-over circuit 43. The audio signal is applied to a speaker 46 through an volume control circuit 44 and an audio output circuit 45. The audio signal is also led to an earphone terminal 47 as a signal audible by earphone. The video signal, on the other hand, is demodulated into a primary color signal by a video/chroma circuit 50, and subjected to γ-compensation at a signal shaping circuit 52. Further, a polarity-reversed signal is taken out from a reverse amplifier circuit 53, and applied to a horizontal scanning circuit through the vertical and horizontal scanning circuits of the liquid crystal panel 5. A screen display circuit 51 is for displaying characters on the screen and applies a control signal to the video/chroma circuit 50. The video signal applied to the sync separator circuit 54, on the other hand, is converted into horizontal and vertical sync signals and applied to a control IC 55. An output signal from the control IC 55 is applied through a flexible wiring 18 to the scanning circuit of the liquid crystal panel 5 thereby to effect timing control of the vertical and horizontal operations.

The reverse amplifier circuit 53 and the control IC 55 are provided on the subordinate board 92, and the remaining circuits on the main board 91.

The power circuit 56 is supplied with a DC voltage from a DC power supply 57 such as an AC adapter, a DC power supply of a battery 58, and a controlled output voltage is supplied to each circuit. Further, a microcomputer 49 is used for control operations by the operating unit 8 including tuning, sound volume control, screen display and TV/video change-over.

The operating unit 8 includes sound volume control switches 81, 82, 83, 84, 85, 86, 87, the contacts of which correspond to A, B, C, D, E, F, etc in FIG. 6 respectively. The functions of these switches are discriminated by a key matrix signal from the microcomputer 49. Specifically, a scanning signal is sent from the microcomputer 49 sequentially through a diode, so that upon depression of a given contact of the switches, the scanning signal is read into the microcomputer 49, thus identifying the particular contact from the data on the line by way of which the scanning signal is read and the data on the timing at which it is read. As a result, the operating unit requires no circuit parts other than the key switches and is thus constructed in this form.

Depending on the type of switch depressed, the microcomputer 49 sends a control signal to the tuning circuit 48, the input change-over circuit 43 and the screen display circuit 51 thereby to effect control as desired by the operator.

The key switch used in the embodiment under consideration is defined not as the one capable of self-holding a physical condition of binary or higher state, but as the one which has a contact thereof closed only during depression with its made discriminated by a read signal from the key matrix circuit. By using such a key switch, the operating unit is made thin, thereby making it possible to arrange a plurality of such switches in the space between the top case 2 and the liquid crystal panel 5.

The key switch in the form of key top providing a protrusion used in this embodiment may be replaced with equal effect by a key switch in sheet form generally used with a card-type calculator or the like. Also, instead of the contacts, a device producing a binary state according to capacity change may be used.

In the case where there is some margin of space between the top case 2 and the liquid crystal panel 5, the key switch may be superseded by a switch of such a type that the contact thereof is closed when given a touch to hold a state and opened when given another touch. The size of the liquid crystal TV set may be equally reduced even by use of the latter type of switch.

The number of key switches is not limited to seven as in the present embodiment, but may be increased or decreased as desired. Further, the other types of switch such as zoom switch may be arranged on the front portion, the space permitting. Each switch should have a width slightly greater than the human finger to assure an operating ease and prevent a depression error even if adjacent switches are located closely to each other. The number of switches arranged in juxtaposition is determined by the lateral width of the liquid crystal TV set proper, the width of the switches and the distance between adjacent switches. If it is desired to arrange more switches on the front portion, they are preferably disposed in stages or divided into the upper and lower sides or the left and right sides of the image display section.

According to the present invention, the front outline of a liquid crystal TV set is reduced substantially to the size of a liquid crystal panel, and therefore even a liquid crystal TV set having a large screen may be produced in compact form.

Further, the fact that the operating unit may be arranged in the space between the top case and the shield case prevents the TV set from thickening.

Furthermore, since the operating unit is located in the same plane as the screen, high visibility, pressing ease and stable operation are assured at the same time.

Figure 7:
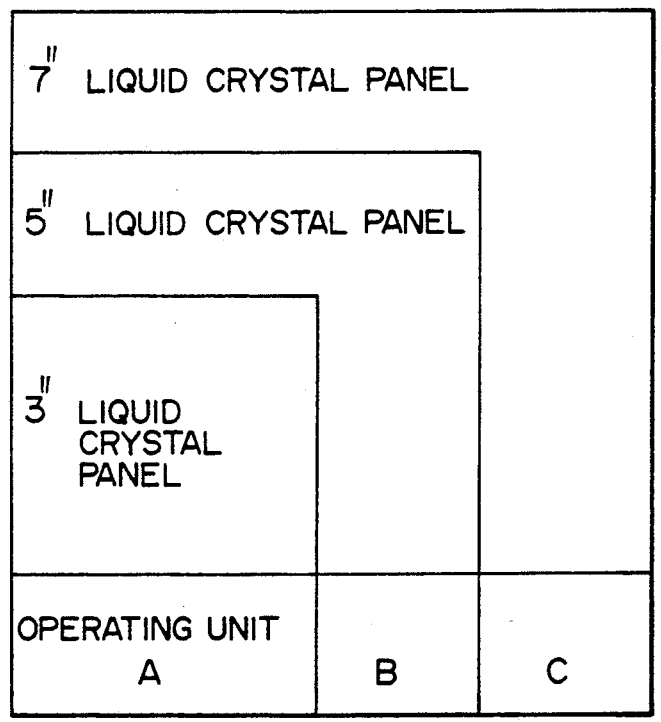
FIG. 7 is a diagram showing an area ratio between the liquid crystal panel and the operating unit of conventional liquid crystal TV sets.

If the operating unit is arranged on other than the liquid crystal panel as in the conventional liquid crystal TV sets, the area occupied by the operating unit would increase with the size of the liquid crystal panel due to the fact that the liquid crystal TV set is usually rectangular in shape requiring a side of the operating unit equal in size to one side of the liquid crystal panel. Specifically, as shown in FIG. 7, a 3-inch liquid crystal panel would require an operating unit of the size A; a 5-inch liquid crystal panel, the size A+B; and a 7-inch liquid crystal panel, the size A+B+C. According to the present invention, in contrast, the area of the operating unit remains substantially the same regardless of the size of the liquid crystal panel because the operating unit is arranged along the peripheral portion of the liquid crystal panel.

We claim:

1. A liquid crystal TV set comprising a liquid crystal panel including both an image display section constructed of a liquid crystal for displaying and a peripheral portion located around said image display section, a scanning circuit for driving the liquid crystal of said image display section being arranged on said peripheral portion of said liquid crystal panel in substantially a plane of said image display section, said TV set further comprising operation means having a plurality of switches arranged on the front part of said peripheral portion of said liquid crystal panel and overlying at least a portion of said scanning circuit.

2. A liquid crystal TV set according to claim 1, wherein the switches of said operating means are of thin key type.

3. A liquid crystal TV set according to claim 2, wherein said key switches constitute a matrix, and a key switch depressed is discriminated according to a key matrix signal applied from control means.

4. A liquid crystal TV set according to claim 1, wherein said operating means is disposed at a lower portion of the front part of the TV set, said TV set further comprising at least a stand for holding the body of the TV set, said stand being arranged on the back of the body.

5. A liquid crystal TV set according to claim 1, wherein said peripheral portion of said liquid crystal panel has at least two subsections including at least a selected one of right and left sides of the image display section and at least a selected one of upper and lower sides of the image display section.

6. A liquid crystal TV set according to claim 1, wherein one of the switches of the operating means is for tuning.

7. A liquid crystal TV set according to claim 1, wherein one of the switches of the operating means is for controlling the brightness of the screen.

8. A liquid crystal TV set according to claim 1, wherein one of the switches of the operating means is for controlling the sound volume.

9. A liquid crystal TV set according to claim 1, wherein one of the switches of the operating means is for switching the functions between television and VTR monitor.

10. A method of fabricating a liquid crystal TV set comprising the steps of:
    holding operating means for the TV between a top case and a liquid crystal panel;
    mounting a center case on the top case and fixing the top case and the center case;
    fixing at least a circuit board in a bottom case; and
    fixing the bottom case on selected one of the top case and the center case.

11. A method according to claim 10, further comprising the step of fixing a back light unit including a back light, a diffusion plate and a reflector on the center case.

12. A method according to claim 10, further comprising the step of setting the operating means in position by at least a stepped portion of the top case.

13. A method according to claim 10, further comprising the step of setting the liquid crystal panel in position by a protrusion formed on the top case.

14. A method according to claim 10, further comprising the step of setting the top case in position by at least a stepped portion of an outer peripheral portion of the center case.

15. A method according to claim 10, further comprising the step of holding the operating means and the liquid crystal panel between the top case and the center case by fixing the top case and the center case.

16. A liquid crystal TV set comprising:
    image display means including a liquid crystal for displaying an image;
    peripheral means arranged on the peripheral portion of the image display means and including horizontal scanning circuits for driving the liquid crystal;
    a liquid crystal panel including the image display means and the peripheral means;
    operating means arranged in the same plane as the peripheral means of the liquid crystal panel and including a plurality of switches and overlying at least a portion of the horizontal scanning circuits; and
    a case for housing the image display means and the operating means;
    said operating means being held between the case and liquid crystal panel;
    said operating means having switches including a thin switch and constituting a matrix.

17. A method of fabricating a liquid crystal TV set comprising a top case, a center case and a bottom case; said method comprising the steps of:
    setting operating means having a plurality of switches in position on the top case by at least a stepped portion of the top case;
    setting a liquid crystal panel in position on the top case by a protrusion formed on the top case;
    setting the top case in position by at least a stepped portion formed on the outer periphery of the center case;
    holding the operating means and the liquid crystal panel between the top case and the center case by fixing the top case and the center case;
    fixing a back liquid unit including a back light, a diffusion plate and a reflector on the center case; and fixing the bottom case having at least a circuit board fixed therein, on selected one of the top case and the center case.

18. A liquid crystal TV set according to claim 1, wherein the switches are manually operable switches.

19. A liquid crystal TV set according to claim 18, wherein said liquid crystal panel has a diagonal dimension of at least 3 inches.

20. A liquid crystal TV set according to claim 16, wherein the plurality of switches are manually operable switches and the liquid crystal panel has a diagonal dimension of at least 4 inches.

* * * * *